United States Patent [19]

Manning et al.

[11] 3,989,160
[45] Nov. 2, 1976

[54] CONTAINER COVER SEAL
[75] Inventors: Bert W. Manning, Bay Village; James F. Norton, Berea, both of Ohio
[73] Assignee: The Hansen Manufacturing Co., Cleveland, Ohio
[22] Filed: Jan. 14, 1976
[21] Appl. No.: 649,030

[52] U.S. Cl. .............................. 220/240; 220/244; 220/250; 220/318; 220/378
[51] Int. Cl.² ......................................... B65D 53/00
[58] Field of Search ........... 220/240, 243, 244, 250, 220/251, 318, 378

[56] References Cited
UNITED STATES PATENTS

| | | | |
|---|---|---|---|
| 3,186,577 | 6/1965 | Tennison | 220/244 |
| 3,244,316 | 4/1966 | Atkinson et al. | 220/318 X |
| 3,329,299 | 7/1967 | Atkinson et al. | 220/250 |

Primary Examiner—George T. Hall

[57] ABSTRACT

A container is utilized to hold fluid under pressure and has a non-circular arcuate opening. A cover member is movable from an open position through the opening to a closed position in which a seal on the cover member sealingly engages a wall of the container. The cover member has an arcuate non-circular configuration corresponding to the configuration of the container opening. When the cover member is moved to the closed position, it may be skewed relative to the container opening so that portions of a side wall of the cover member are spaced relatively close to a side wall of the container while other portions of the side wall of the cover member are spaced relatively far from the side wall of the container. An improved seal is utilized to prevent leakage of fluid under pressure from inside of the container around the skewed cover. This seal includes a body portion which circumscribes the cover member and is disposed between a rim of the container wall and a rim of the cover member. In addition, the seal has a lip portion which is exposed to the fluid pressure in the container and is urged into sealing engagement with the inner surface of the container wall by the fluid pressure. This seal construction provides for sealing engagement between the body portion of the seal and the lip portion of the seal in the areas where the side wall of the skewed cover is spaced a relatively large distance from the side wall of the container. The lip portion may advantageously be provided with a bead which projects toward the container wall to promote sealing engagement of the lip portion with the container wall, particularly at relatively low container pressure.

9 Claims, 8 Drawing Figures

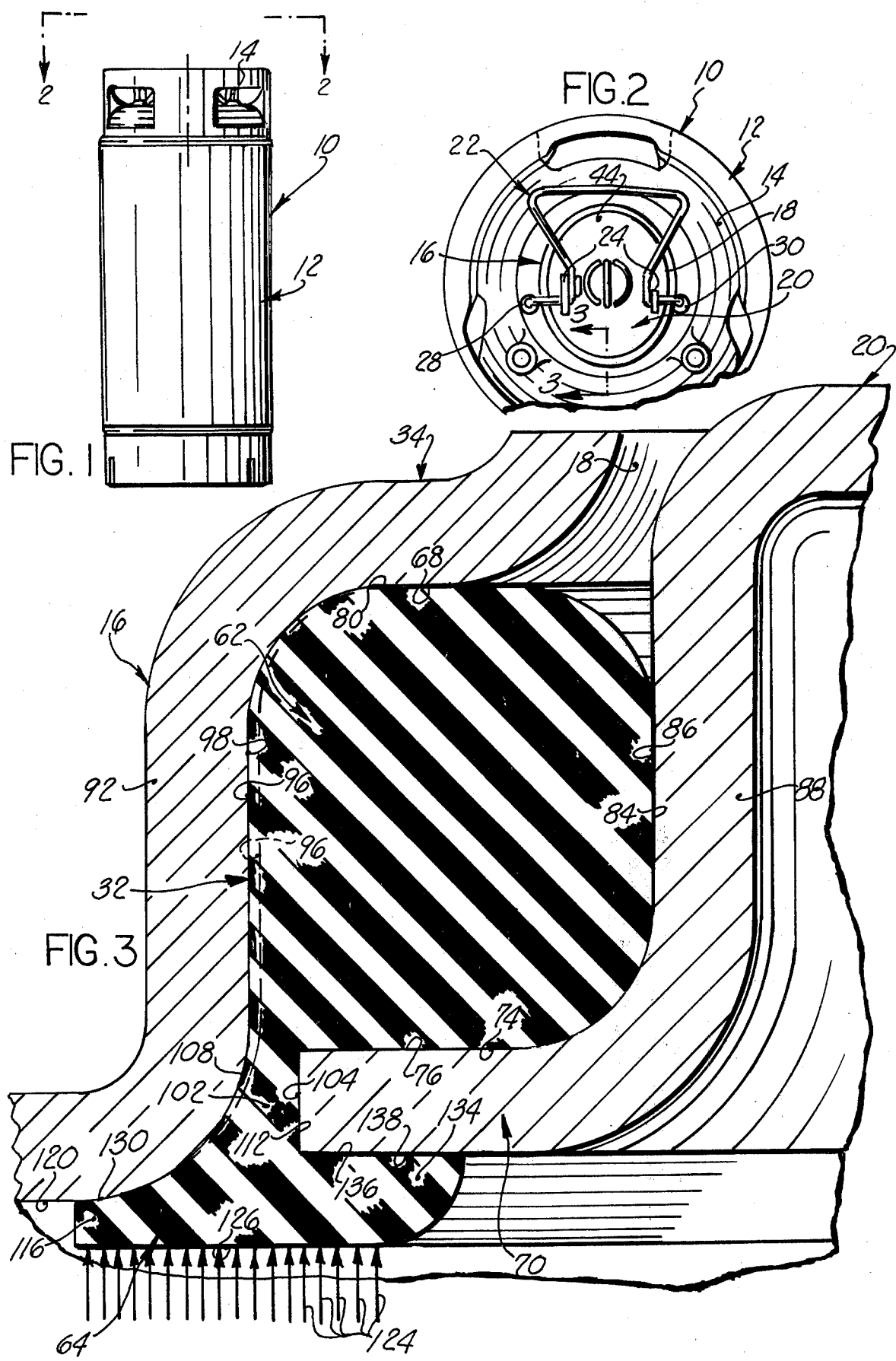

CONTAINER COVER SEAL

BACKGROUND OF THE INVENTION

This invention relates generally to an improved seal for a container cover and more specifically to a seal which is utilized in association with a non-circular arcuate container cover which may be closed in a skewed position relative to an opening in the container.

Containers having oval covers have previously been utilized to hold soft drink syrups under pressure. When the container is emptied, it is cleaned and refilled with syrup. After the container has been filled, a cover having an oval rim is inserted through a similarly shaped opening in one end wall of the container by moving the cover through the opening with the minor axis of the cover oriented generally parallel to a major axis of the opening. The cover is then rotated to align the major axis of the cover with the major axis of the opening and locked in place. As the cover is locked in place, an O-ring seal having a circular cross-sectional configuration is clamped between the oval rim of the cover and the oval rim of the container.

When the container is being closed in this manner, the cover is frequently closed in a skewed relationship with the opening in the container. Although the cover can be locked in place in a skewed relationship with the opening, difficulty has been encountered in obtaining a tight seal between the cover and the container. This is because the O-ring seal is ineffective to seal the opening between the cover and the end wall of the container in areas where a side wall of the skewed cover is spaced a relatively large distance from the container wall. Although there are many different known seal constructions, such as the ones disclosed in U.S. Pat. Nos. 3,578,202; 2,753,074; 2,264,713 and 1,784,516, which have been utilized in many different types of environments, these seals have not been used in connection with the non-circular cover of a soft drink syrup or other liquid.

SUMMARY OF THE PRESENT INVENTION

The present invention provides a new and improved seal which is utilized in association with an oval or non-circular container opening and an oval or non-circular cover member which may be closed in a skewed relationship with the opening. The seal includes a body which circumscribes the oval cover and is compressed between a rim of the cover and a rim portion of the container wall. In addition, the body of the seal is disposed between axially extending side walls of the cover and the container to further seal the opening between the cover and the container.

It is contemplated that the oval cover may be skewed when it is closed so that the body of the seal does not sealingly engage the side wall of the container. To prevent leakage of fluid from the container in these circumstances, the seal has a lip which extends outwardly from the body of the seal. This lip is pressed in firm sealing engagement with the inner surface of the container wall by the fluid pressure within the container. Even though the cover is skewed, a firm seal is obtained between the lip and the inside of the cover to prevent the leakage of fluid and/or liquid from inside of the container around the seal. In addition, a firm seal is obtained between the body portion of the seal and the rim of the opening in the wall of the container to prevent the entry of foreign particles between the seal and side wall of the container.

Accordingly, it is an object of this invention to provide a new and improved seal for use in association with a non-circular arcuately shaped cover which is utilized to block a non-circular arcuately shaped opening in a container and wherein the cover may be closed in a slightly skewed orientation relative to the opening.

Another object of this invention is to provide a new and improved seal having a body which is utilized in association with a non-circular arcuate container cover and which sealingly engages a rim of the container and a lip portion which is pressed into sealing engagement with an inner surface of the container wall to provide a pair of tight seals between the interior of the container and the cover.

BRIEF DESCRIPTION OF THE DRAWINGS

The foregoing and other objects and features of the present invention will become more apparent upon a consideration of the following description taken in connection with the accompanying drawings wherein:

FIG. 1 is an illustration of a container;

FIG. 2 is a plan view, taken generally along the line 2—2 of FIG. 1, illustrating how a non-circular arcuate opening in an end wall of a container is blocked by a non-circular arcuate cover;

FIG. 3 is a greatly enlarged sectional view, taken generally along the line 3—3 of FIG. 2, illustrating the relationship between the cover, an improved seal, and a wall of the container;

DESCRIPTION OF SPECIFIC PREFERRED EMBODIMENTS OF THE INVENTION

Figure 6:
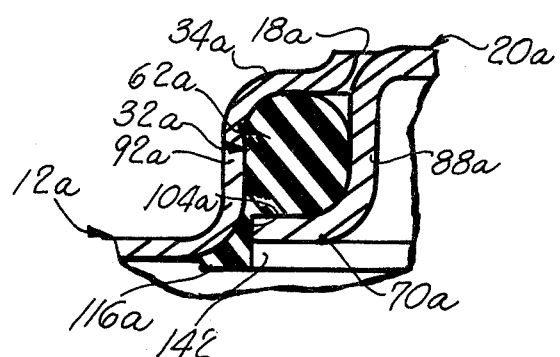
FIG. 6 is a sectional view, generally similar to FIG. 3 but on a reduced scale, illustrating a second embodiment of the improved seal.

A container assembly 10 (FIG. 1) is utilized to ship liquids such as soft drink syrups, under pressure. The assembly 10 includes a main container body 12 having an end wall 14 with a generally oval collar 16 which defines a non-circular arcuate opening 18 which, in the illustrated embodiment of the invention, has an oval configuration. An oval cover 20 is held in position by a clamping handle 22. The clamping handle 22 is pivotally mounted on flanges 24 connected with the cover so that end portions 28 and 30 of the handle bear against the end wall 14 of the container 12 to urge the cover outwardly. The outward force supplied to the cover 20 by the handle 22 compresses an improved seal 32 against an oval rim 34 of the collar 16. The manner in which the handle 22 cooperates with the cover 20 and container end wall 14 is the same as disclosed in U.S. Pat. Nos. 3,186,577 and 3,244,316.

After the container 12 has been emptied of its liquid, for example soft drink syrup, it is cleaned and refilled with liquid. Since the cover 20 and opening 18 have the same oval or non-circular arcuate configuration, the cover can be moved from an open position spaced apart from the container to a closed position by rotating the cover so that a minor axis 38 of the cover (see FIG. 4) is parallel to a major axis 40 of the opening 18. An end portion 44 of the cover is then inserted through the opening 18 until the entire cover 20 is within the container 12. The cover is then rotated to align its major axis 46 (FIG. 4) with the major axis 40 of the opening 18. The handle 22 is then pivoted relative to the flanges 24 to pull the cover and seal 32 (see FIG. 3) outwardly toward the rim portion 34 of the collar 16.

Due to the fact that the cover 20 is oriented relative to the opening 18 by rotating the handle 22 when the cover is located within the container 12 and the handle is outside of the container, the handle 22 may be actuated to clamp the cover in a skewed relationship with the opening 18. This has been illustrated in FIG. 4 where the major axis 46 and minor axis 38 of the cover are angularly offset from the major axis 40 and minor axis 50 of the opening 18. This results in relatively large gaps 52 and 54 between portions of the cover 20 and the rim 34 while other portions of the cover are disposed in abutting engagement with the rim in the manner indicated at 56 and 58 in FIG. 4. Although a diligent effort is made to close the cover 20 in alignment with the opening 18 in the container 12 in the manner illustrated in FIG. 2, during a closing of a substantial number of containers 12 it is known that at least some of the covers will be closed in a skewed relationship with the associated openings.

When the cover 20 is in a skewed relationship with the opening 18, it is difficult to provide a fluid tight seal between the cover and the end wall collar 16 of the container. This is because of the relatively large gaps 52 and 54 formed between the cover and portions of the collar 16 and the relatively small gaps 56 and 58 between other portions of the cover and the collar. If a fluid tight seal is not obtained between the cover 20 and the end wall collar 16, the low pressure gas (15 P.S.I.G.) within the container 12 will escape and liquid can seep from the container.

In accordance with a feature of the present invention, the seal 32 is constructed in such a manner as to provide a fluid tight seal between the cover 20 and the container 12 when the cover 20 is in a skewed relationship with the opening 18. To this end, the seal 32 (FIG. 3) includes a body portion 62 and a lip portion 64. The body portion 62 circumscribes the oval cover member 20 and is pressed against an oval inner surface 68 of the oval collar wall rim 34 by an oval rim 70 of the cover member 20. Thus, the seal body 62 has an inner surface 74 which is disposed in abutting engagement with an oval outer surface 76 of the cover rim 70. Similarly, an oval outer surface 80 of the seal body 62 is disposed in abutting engagement with the oval rim surface 68.

The oval inner surface 68 of the container rim 34 and the oval outer surface 76 of the cover rim 70 extend parallel to each other and have the same non-circular arcuate configuration. The oval cover rim 70 is larger than the oval opening 18 and is disposed axially inwardly of the oval container rim 34. Therefore, when the handle 22 is pivoted to the locked position illustrated in FIGS. 2 and 4, the cover 20 is pulled axially outwardly to cause the cover rim 70 to press the oval outer surface 80 of the seal body 62 toward the oval inner surface of the container rim 34.

If the cover 20 is aligned with the opening 18, a fluid tight seal is obtained between the oval outer surface 80 of the seal body 62 and the oval inner surface 68 of the container rim 34. However, if the cover 20 is skewed relative to the opening 18, a fluid tight seal may not be obtained between the seal surface 80 and the container rim surface 68. It is believed that this lack of sealing engagement results from the fact that the seal body 62 is compressed radially inwardly in the areas indicated at 56 and 58 in FIG. 4 so that the seal body 62 has a relatively large axial extent in these areas sufficient to prevent sealing engagement between the surfaces 68 and 80 in other portions of the seal body. In addition to promoting sealing engagement between the surfaces 68 and 70, the outward pressure on the seal body 62 promotes sealing engagement between the outer surface 76 of the cover rim 70 and the inner surface 74 of the seal body 62. Since the seal body 62 circumscribes the cover 20 and has the same oval configuration as the cover rim 70 and container rim 34, a fluid tight seal may be obtained between the cover 20 and container rim 34 throughout the extent of the cover and container rim if the cover is not excessively skewed.

Figure 5:
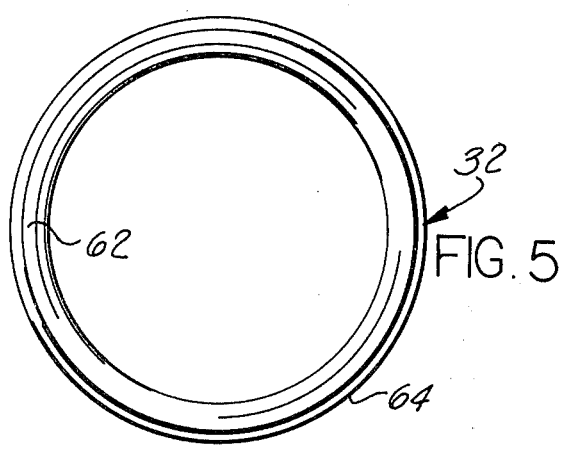
FIG. 5 is a plan view of the seal in a relaxed condition before it is mounted on the container cover in the manner illustrated in FIG. 3.

The seal 32 is molded of a suitable polymeric material and initially has a circular configuration (see Fig. 5). The circular seal 32 is resiliently deflected to conform to the oval configuration of the cover 20 when it is mounted on the cover. This resilient deformation of the seal 32 results in an axially extending side surface 84 of the seal being pressed firmly against an axially extending side surface 86 of the cover side wall 88. The pressure engagement between the surface 84 of the seal body 62 and the surface 86 of the cover side wall 88 prevents fluid leakage between the surfaces. This fluid seal becomes particularly tight when the cover 20 is pulled outwardly by the handle 22 since the seal body 62 tends to expand radially inwardly and outwardly under the influence of the clamping pressure applied to the seal body by the oval cover rim 70 and the oval container rim 34.

When the cover 20 is disposed in a skewed relationship with the oval opening 18 (in the manner illustrated in FIG. 4 of the drawings) the distance between the oval side wall 88 of the cover 20 and an oval side wall 92 of the container collar 16 varies. Thus, the cover side wall 88 is relatively close to the container side wall 92 in the areas indicated at 56 and 58 in FIG. 4. However, in the areas indicated at 52 and 54 the cover side wall 88 is spaced a relatively large distance from the container side wall 92.

Since the cover side wall 88 and container side wall 92 both extend vertically upwardly, in the areas where the cover side wall 88 is relatively close to the container side wall 92 a radially outer surface 96 of the seal body 62 is pressed firmly against a radially inner surface 98 of the oval collar side wall 92 in the manner illustrated in solid lines in FIG. 3. However, in the areas where the oval cover side wall 88 is spaced a relatively large distance from the oval collar side wall 92, the surface 96 of the seal body may be separated from the inner surface 98 of the collar side wall 92 in the manner illustrated in dashed lines in FIG. 3. The radial compression of the seal body 62 at points 56 and 58 causes an increase in the seal body 62 axial dimension locally. This local increase in axial dimension prevents the normal sealing contact force of the seal outer surface 80 with the rim surface 68 at points 52 and 54. This lack of contact force and the clearance possible between the seal body radially outer surface 96 and inner surface 98 of the collar side wall 92 will create a leakage path for gas or liquid past the seal body 62 at points 52 and 54.

Figure 4:
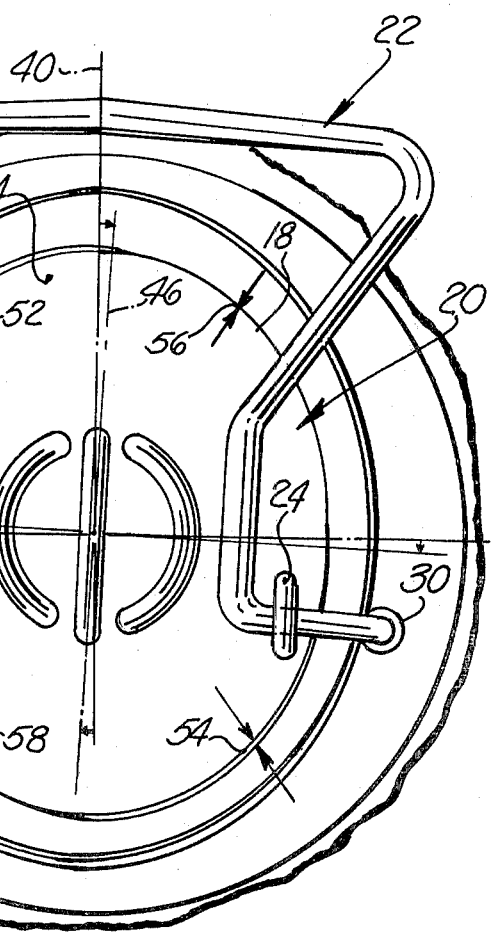
FIG. 4 is a plan view, generally similar to FIG. 2 and on an enlarged scale illustrating the container cover in a skewed orientation relative to the opening in the container.

In order to prevent any possible leakage from the container 12, particularly when the cover 20 is closed in a skewed relationship with the opening 18 in the manner illustrated in FIG. 4, the seal 32 includes a lip portion 64 which is pressed into sealing engagement with the container wall by the fluid pressure within the container. The lip portion 64 of the seal 32 is initially formed with the same circular configuration as the body 62 of the seal (see FIG. 5). When the seal 32 is mounted on the cover 20, the lip portion 64 is deflected to the same oval configuration as the opening 18 and the side wall 92 of the collar 16.

The lip portion 64 has an axially extending section 102 (FIG. 3) which extends between the oval radially outer minor surface 104 of the cover rim 70 and the similarly shaped inner surface 98 of the container side wall 92. When the handle 22 is pivoted to pull the cover 20 axially outwardly, an axially arcuately sloping outer surface 108 of the lip 64 is pressed firmly against an arcuately curving portion of the side wall surface 98. It whould be noted that the lip surface 108 forms a continuation of the seal body surface 96 and there are no discontinuities between the two surfaces. An axially extending radially inner surface 112 of the lip portion 102 is pressed into engagement with the axially extending radially outer cover rim surface 104 by the inner action between the arcuately curving outer surface 108 of the lip portion 102 and the container side wall 92 as the cover 20 is pulled axially outwardly to promote engagement between the portion 102 and both the side wall 92 and the cover rim 70.

An axially inner portion 116 of the lip 64 extends radially outwardly along an axially inner surface 120 of the collar 16. The axially inner surface 120 is a continuation of the side wall surface 98 and there are no discontinuities between the axially inner surface 120 of the collar 16 and the side wall surface 98. The radially outwardly extending portion 116 of the lip 64 is pressed firmly against the container surface 120 by the fluid pressure in the container 12. This fluid pressure is indicated schematically by the arrows 124 in FIG. 3.

Due to the fluid pressure against an inner surface 126 of the radially extending portion 116 of the lip 64, an axially outer surface 130 of the lip 64 is pressed into sealing engagement with the inner surface 120 of the container to prevent any leakage of fluid between the seal 32 and the wall of the container 12. It should be noted that the radially extending portion 116 of the seal lip 64 has a sufficient radial extent to engage the inner surface 120 of the container in the areas where the rim 70 is skewed and the cover 20 is spaced a relatively large distance from the container side wall 92. Therefore, the lip 116 is pressed into sealing engagement with the inner surface 120 throughout the length of an oval path circumscribing and having a configuration similar to the oval container opening 18.

Accordingly, it can be seen that the seal 32 cooperates with the cover 20 and side wall of the container 12 to provide two seals in series to prevent fluid leakage from the container 12 when the cover is closed in a skewed orientation relative to the opening 18. The first or innermost of these seals is formed by the lip 116 and prevents any leakage of fluid or liquid from the inside of the container into the space between the outer surface of the seal 32 and the inner surface of the container side wall 92. A second or outer seal may be formed between the outer surface 80 of the body portion 62 of the seal and the inner surface 68 of the container rim 34.

In the embodiment of the invention illustrated in FIG. 3, the seal 32 is provided with a radially inwardly projecting lip 134 having an axially outer surface 136 which is disposed in sealing engagement with an inner surface 138 of the oval cover rim 70. The lip 134 engages the cover rim 70 to hold the seal 32 in place on the cover 20. In addition, the lip 134 is pressed against the cover rim 70 by the fluid pressure in the container 12 to insure that a fluid tight seal is formed between the cover rim surface 138 and the axially outer surface 136 of the lip 134.

Under certain circumstances it is contemplated that the lip 134 may be objectionable. This is because it overlaps a portion of the cover rim 70 and is rather difficult to clean. Accordingly, in the embodiment of the invention illustrated in FIGS. 6 and 7, the seal is provided with only a radially outwardly extending lip and is not provided with a radially inwardly extending lip, corresponding to the lip 134 of FIG. 3. Since many of the components of the embodiment of the invention illustrated in FIG. 6 are the same as the embodiment of the invention illustrated in FIG. 3, similar numerals will be utilized to designate similar components, the suffix letter *a* being associated with FIG. 6 to avoid confusion.

In the embodiment of the invention illustrated in FIG. 6, a cover 20a is utilized to block an oval opening 18a in a container 12a. An oval seal 32a has a body portion 62a which is located between an oval cover rim 70a and container rim 34a. In addition, the seal 32a includes an oval lip 116a. The lip 116a is pressed into sealing engagement with an inner surface of the container 12a by the fluid pressure within the container.

Figure 7:
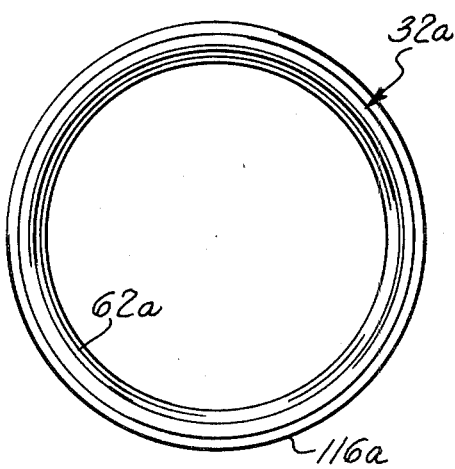
FIG. 7 is a plan view, generally similar to FIG. 5, of the seal of FIG. 6 in a relaxed condition before it is mounted on the container cover.

In accordance with a feature of the embodiment of the invention illustrated in FIGS. 6 and 7, the seal 32a has an axially extending surface 142 which extends straight axially inwardly from the oval rim surface 104a of the cover 20a. This configuration of the lip 116a makes it relatively easy to clean since there is no overlap between the lip 116a and the cover rim 70a. In addition, it is relatively easy to disengage the gasket 32a from the cover 20a during cleaning and to then reposition the gasket on the cover 20a. The seal 32a, like the seal 32 of FIG. 5, is initially molded to a circular configuration (see FIG. 7) and then is resiliently deflected as it is mounted on the oval cover member 20a.

Figure 8:
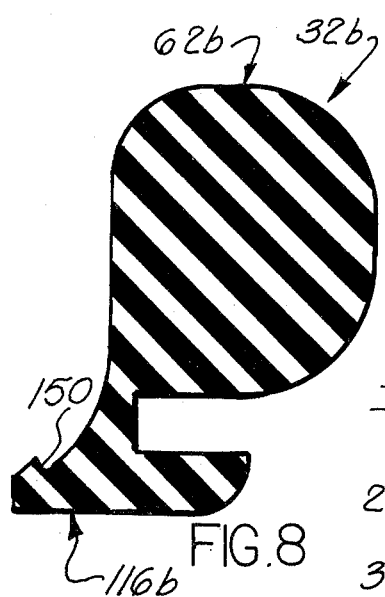
FIG. 8 is a sectional view, generally similar to FIG. 6 of another embodiment of the improved seal.

It is contemplated that difficulty may be encountered in obtaining a fluid tight seal between the lip portion of the seal and the container wall when the fluid pressure in the container is relatively low. Accordingly, it is contemplated that the seal may be modified in the manner illustrated in FIG. 8 to promote sealing engagement between the lip portion of the seal and the container wall when a relatively low fluid pressure is in the container. Such a seal construction is illustrated in FIG. 8. Since the seal construction of FIG. 8 is generally similar to the seal construction of FIGS. 1–5, similar numerals will be utilized to designate similar components, the suffix letter *b* being associate with the embodiment of FIG. 8 to avoid confusion.

The seal 32b of FIG. 8 includes a body portion 62b which is disposed between an oval cover rim (not shown) and container rim, similar to the cover and container rims 70 and 34 of FIG. 3. A lip 116b is pressed into engagement with an inner surface of an associated container by fluid pressure within the container.

In accordance with a feature of the embodiment of the invention illustrated in FIG. 8, the lip 116b is provided with an elongated bead or projection 150 which circumscribes the body portion 62b of the seal. The bead 150 is continuous and has an oval configuration corresponding to the oval configuration of the lip portion 116b of the seal 32b. The bead projects upwardly toward the inner surface of the container so that it will promote sealing engagement between the lip portion 116b of the seal and the inner surface of the container when a relatively low fluid pressure is applied against the lip portion 116b of the seal. Although it is contemplated that the bead 150 could have many different configurations, in the specific illustrated preferred embodiment of FIG. 8 the bead has an included inside angle of approximately 90° with side surfaces which extend at approximately 45° to a vertical or axially extending plane. This provides for a sharp peak on the bead 150 to promote sealing engagement between the bead and the inner surface of the container. However, the bead 150 could have other configurations if desired.

Although the bead 150 has been illustrated herein in association with only the embodiment of the invention illustrated in FIG. 8, it is contemplated that a bead, similar to the bead 150, could be utilized in association with the embodiments of the invention illustrated in FIGS. 3 and 6. It should be noted that if a bead, similar to the bead 150 of FIG. 8 is associated with the embodiment of the inventions illustrated in FIGS. 3 and 6, the seal disclosed in these embodiments of the invention will cooperate with a container in the same manner as previously explained. However, the utilization of a bead similar to the bead 150 in association with these embodiments of the invention would promote sealing engagement between the lip portion of the seal and the inner surface of the container when the container contains fluid at relatively low pressures.

In view of the foregoing, it is apparent that an improved seal 32 is utilized in association with an oval or non-circular container opening 18 and an oval or non-circular cover member 20 which may be closed in a skewed relationship with the opening. The seal includes a body 62 which circumscribes the oval cover 20 and is compressed between a rim 70 of the cover and a rim portion 34 of the container wall. In addition, the body 62 of the seal is disposed between axially extending side walls 88 and 92 of the cover and the container to further seal the opening between the cover and the container.

It is contemplated that the oval cover 20 may be skewed when closed so that the body 62 of the seal 32 does not sealingly engage the side wall of the container (in the manner shown in dashed lines in FIG. 3). To prevent leakage of fluid from the container 12 in these circumstances, the seal 32 has a lip 64 which extends outwardly from the body 62 of the seal. This lip is pressed in firm sealing engagement with the inner surface 120 of the container wall by the fluid pressure within the container. Even though the cover 20 is skewed, a firm seal is obtained between the lip 64 and the inside of the cover to prevent the leakage of fluid and/or liquid from inside of the container around the seal.

Having described specific preferred embodiments of the invention, the following is claimed:

1. An assembly comprising a container body for holding fluid under pressure, said container including wall means defining a non-circular arcuate opening in said container, said wall means including an axially extending arcuate side surface circumscribing a first area and a non-circular arcuate outer rim surface extending transversely to and inwardly from said side surface and circumscribing a second area which is less than said first area, cover means for blocking said non-circular arcuate opening in said container, said cover means including a non-circular arcuate cover member having a configuration similar to the configuration of said opening and being insertable through said opening to move said cover member between an open position spaced apart from said container and anyone of a plurality of closed positions in which said cover member is circumscribed by said side surface of said wall means, said cover member including a main body portion, a non-circular arcuate side wall circumscribing said main body portion and extending inwardly from said main body portion toward the interior of said container when said cover member is in anyone of said closed positions, and a non-circular arcuate rim circumscribing said side wall of said cover member and extending transversely outwardly from an inner portion of said side wall of said cover member, said rim of said cover member having an outer peripheral surface of a non-circular arcuate configuration similar to the non-circular arcuate configuration of said side surface of said wall means and circumscribing a third area which is less than said first area and greater than said second area, said cover member in a first one of said closed positions being disposed with said arcuate side wall of said cover member being parallel to and circumscribed by said side surface of said wall means and with said rim of said cover member disposed inwardly from said rim surface of said wall means, said cover member in a second one of said closed positions being disposed with said arcuate side wall of said cover member in a skewed relationship with and circumscribed by said side surface of said wall means so that the spacing between said side wall of said cover member and said side surface of said wall means varies, said rim of said cover member being disposed inwardly from said rim surface of said wall means when said cover member is in said second closed position, and seal means for sealingly engaging said wall means and said cover member to prevent fluid leakage from said container when said cover member is in anyone of said plurality of closed positions, said seal means including a body portion and an outwardly projecting lip portion, said body portion of said seal means being disposed between said side wall of said cover member and said side surface of said wall means and between said rim of said cover member and said rim surface of said wall means when said cover member is in anyone of said plurality of closed positions, said lip portion of said seal means being disposed between and in engagement with said wall means and said outer peripheral surface of said rim of said cover member when said cover member is in anyone of said plurality of closed positions.

2. An assembly as set forth in claim 1 wherein said lip portion of said seal has a first surface disposed in abutting engagement with said container wall means when said cover member is in anyone of said plurality of closed positions and a second surface opposite from said first surface and exposed to the fluid pressure in said container when said cover member is in anyone of said plurality of closed positions to urge said first surface into sealing engagement with said container wall means.

3. An assembly as set forth in claim 1 further including means connected with said cover member for urging said cover member outwardly when said cover member is in said second one of said plurality of closed positions to at least partially compress said body portion of said seal means between said rim surface of said container wall means and said rim of said cover member to provide for sealing engagement of said body portion of said seal means with said rim surface of said container wall means throughout the length of said rim surface when said cover member is in said second one of said plurality of closed positions.

4. An assembly as set forth in claim 3 wherein said lip portion of said seal means sealingly engages said container wall means throughout the length of said lip portion and at a location inwardly from said rim surface when said cover member is in said second one of said plurality of closed positions to provide for sealing engagement of said seal means with said container wall means even though the spacing between said side wall of said cover member and said side surface of said wall means varies when said cover member is in said second one of said plurality of closed positions.

5. An assembly as set forth in claim 4 wherein said body portion of said seal means has an arcuate outer side surface, a first portion of said arcuate outer side surface of said body portion of seal means being disposed in sealing engagement with said side surface of said container wall means when said cover member is in said second position, a second portion of said arcuate outer side surface of said body portion of said seal means being spaced apart from said side surface of said container wall means when said cover member is in said second position.

6. An assembly as set forth in claim 1 wherein said rim of said cover member has inner and outer major side surfaces, said body portion of said seal means being disposed in sealing engagement with said outer major side surface of said rim of said cover member, said lip portion of said seal means being disposed in sealing engagement with said major side surface of said rim of said cover member at a location opposite from a location where said body portion of said seal means engages said outer major side surface of said rim of said cover member.

7. An assembly as set forth in claim 1 wherein said rim of said cover member has inner and outer major side surfaces, said body portion of said seal means being disposed in sealing engagement with said outer major side surface of said rim of said cover member, said lip portion of said cover member extending outwardly of and being spaced apart from said inner major side surface of said rim of said cover member to facilitate cleaning of said cover member.

8. An assembly as set forth in claim 1 wherein said seal means is connected with said cover member for movement therewith between the open and closed positions.

9. An assembly as set forth in claim 1 wherein said lip portion includes an elongated protuberance which circumscribes said body portion and projects toward said wall means to promote the initial sealing engagement of said lip portion with said wall means.

* * * * *